(12) United States Patent
Cheng et al.

(10) Patent No.: US 10,951,526 B2
(45) Date of Patent: Mar. 16, 2021

(54) TECHNOLOGIES FOR EFFICIENTLY DETERMINING A ROOT OF CONGESTION WITH A MULTI-STAGE NETWORK SWITCH

(71) Applicant: Intel Corporation, Santa Clara, CA (US)

(72) Inventors: Albert S. Cheng, Bellevue, WA (US); Michael A. Parker, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 737 days.

(21) Appl. No.: 15/639,864

(22) Filed: Jun. 30, 2017

(65) Prior Publication Data
US 2019/0007317 A1    Jan. 3, 2019

(51) Int. Cl.
*H04L 12/801* (2013.01)
*H04L 12/835* (2013.01)
*H04L 12/26* (2006.01)

(52) U.S. Cl.
CPC .............. *H04L 47/11* (2013.01); *H04L 47/30* (2013.01); *H04L 43/16* (2013.01)

(58) Field of Classification Search
CPC ........... H04L 43/16; H04L 47/11; H04L 47/30
See application file for complete search history.

(56) References Cited

U.S. PATENT DOCUMENTS

| 2011/0119421 | A1* | 5/2011 | Basu ....................... H04L 47/10 710/240 |
| 2012/0117225 | A1* | 5/2012 | Kordasiewicz ..... H04L 65/1083 709/224 |
| 2016/0291885 | A1* | 10/2016 | Pendharkar ........... G06F 3/0613 |

* cited by examiner

*Primary Examiner* — Gbemileke J Onamuti
(74) *Attorney, Agent, or Firm* — Compass IP Law PC

(57) ABSTRACT

Technologies for determining a root of congestion include a network switch. The network switch is to operate arbiter units in at least one upstream stage at a packet transfer rate that is greater than a packet transfer rate of an arbiter unit in an output stage, determine whether an input buffer of a remote network switch in communication with the output stage has sustained congestion over a first predefined time period, determine whether an output buffer of the arbiter unit in the output stage has sustained congestion over a second predefined time period, and determine, as a function of whether the input buffer of the remote network switch has sustained congestion and whether the output buffer of the arbiter unit in the output stage has sustained congestion, whether the network switch is a root of congestion.

30 Claims, 8 Drawing Sheets

TECHNOLOGIES FOR EFFICIENTLY DETERMINING A ROOT OF CONGESTION WITH A MULTI-STAGE NETWORK SWITCH

BACKGROUND

To manage congestion in a fabric, some network switches include mechanisms to detect traffic flows that cause sustained incast congestion (e.g., a large influx of packets that build up faster than the network switch can output the packets). A network switch experiencing sustained incast condition is sometimes referred to as "the root of congestion" because the network switch becomes the cause of a decrease in overall throughput in a fabric. Once identified, the network switch may deploy a mechanism to mark all of the packets associated with the incast to notify an endpoint device to reduce the speed at which the packets are sent to the network switch, to prevent continual build-up of packets in the network switch.

Some high-radix switches with multiple levels of arbitration, which are sometimes referred to as "stages," may include a detection mechanism at each stage of the network switch, to detect whether and which input streams of packets to the corresponding stage are experiencing an incast. However, equipping each stage with a detection mechanism adds cost and complexity to the multi-stage network switch. Additionally, in some multi-stage network switches, the stages may have shallow buffers. As such, when a large packet encounters any form of congestion, the packet can fill the shallow buffer relatively quickly, causing the detection mechanism associated with the corresponding stage to have difficulty distinguishing between temporary and sustained congestion.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
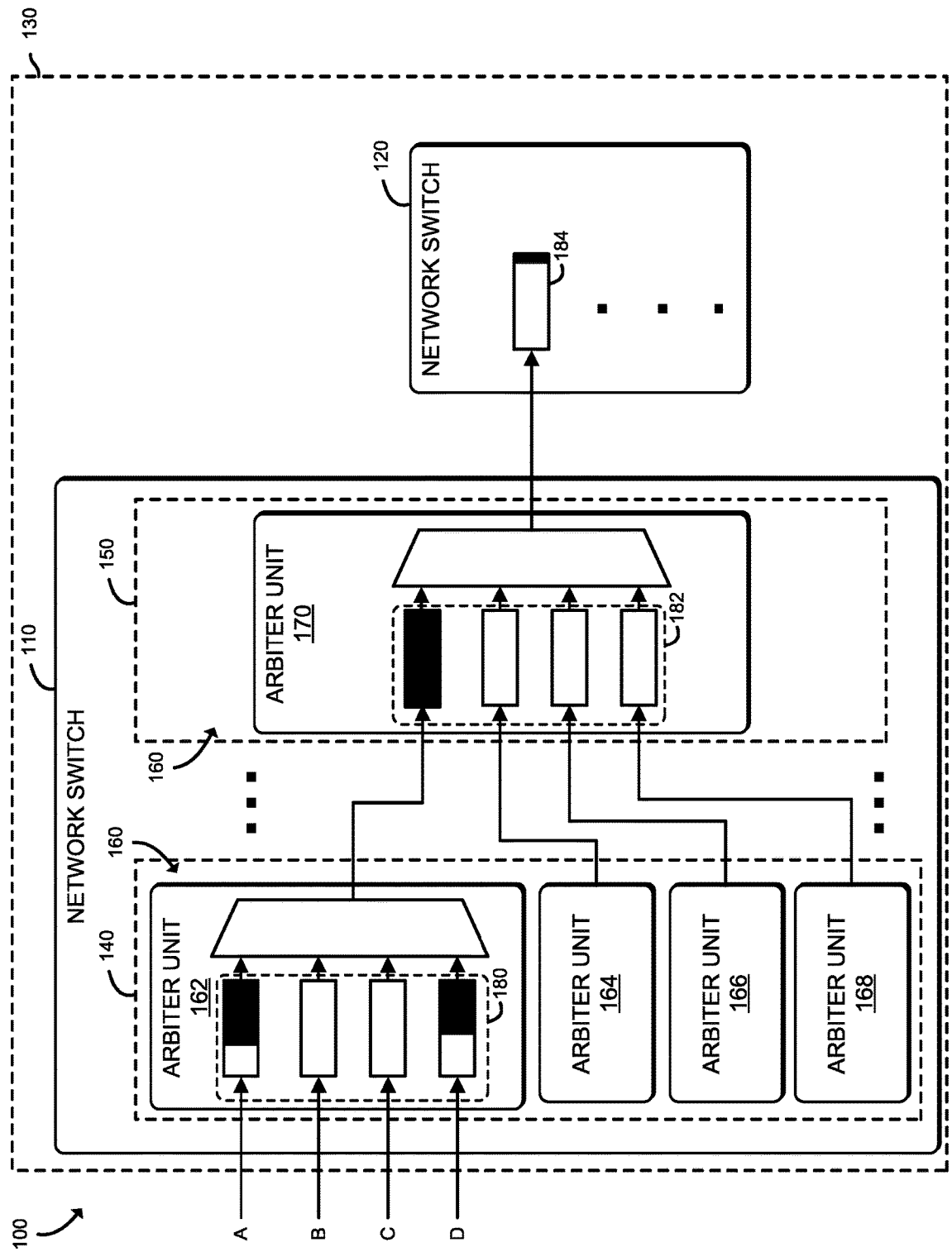
FIG. 1 is a simplified block diagram of at least one embodiment of a system for efficiently determining a root of congestion with a multi-stage network switch.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

As shown in FIG. 1, an illustrative system 100 for determining a root of congestion with a multi-stage network switch 110 includes the multi-stage network switch 110 in communication with another network switch 120 in a network 130. The network switch 110 includes multiple stages 140, 150, and each stage 140, 150 includes one or more arbiter units 160, each of which may be embodied as any device or circuitry, such as a sub-switch, capable of transferring packets from one or more input streams to a downstream device (e.g., another network switch, such as the network switch 120, or another device). In the illustrative embodiment, the first stage 140 includes arbiter units 162, 164, 166, and 168 and the second stage 150, referred to herein as the output stage, includes an arbiter unit 170. In other embodiments, the number of arbiter units 160 in each stage 140, 150 may differ from the illustrated embodiment, and the number of stages 140, 150 may be greater than two. Regardless, the stages 140, 150 form a hierarchy in which the number of arbiter units 160 in each subsequent stage (e.g., moving from an input side of the network switch 110 to an output side of the network switch 110) decreases. In operation, the arbiter units 162, 164, 166, 168 in the input stage 140 may receive input streams of packets from other devices (e.g., compute devices, other network switches, etc.). In FIG. 1, the arbiter unit 162 is shown in detail, with input streams A, B, C, and D entering a set of corresponding input buffers 180. It should be understood that, while not shown, each of the arbiter units 164, 166, 168 may receive input streams that may feed into the arbiter unit 170 in the output stage 150. As shown, the arbiter unit 170 includes a set of corresponding buffers 182 in which packets from the upstream stages (e.g., the input stage 140 and any intervening stages), flow through as the arbiter unit 170 sends the packets out of the network switch 110 (e.g., to the network switch 120, which has a corresponding input buffer 184). In operation, the arbiter units 160 (e.g., the arbiter units 162, 164, 166, 168) in the upstream stages (e.g., the input stage 140 and any intervening stages) transfer packets at a rate that is greater than the transfer rate of the arbiter unit 170. As such, as long as the combined packet rate injected by A, B, C, and D exceeds the transfer rate of the arbiter unit 162, which exceeds the transfer rate of the arbiter unit 170, the output buffers 182 would be filled up. Furthermore, unlike some multi-stage network switches in which the arbiter units in every stage include an incast congestion detection mechanism, in the multi-stage network switch 110, sustained incast congestion is determined only at the arbiter unit 170 of the output stage 150, as described in more detail herein. By operating the transfer rate of the arbiter units 160 in the upstream stages and by determining whether sustained congestion is occurring in network switch 120 (e.g., in the remote input buffer 184), the network switch 110 is able to determine whether the network switch 110 is a root of congestion in the network 130 without requiring each arbiter unit 160 upstream to output stage 150 to have a separate incast congestion detection mechanism.

Figure 2:
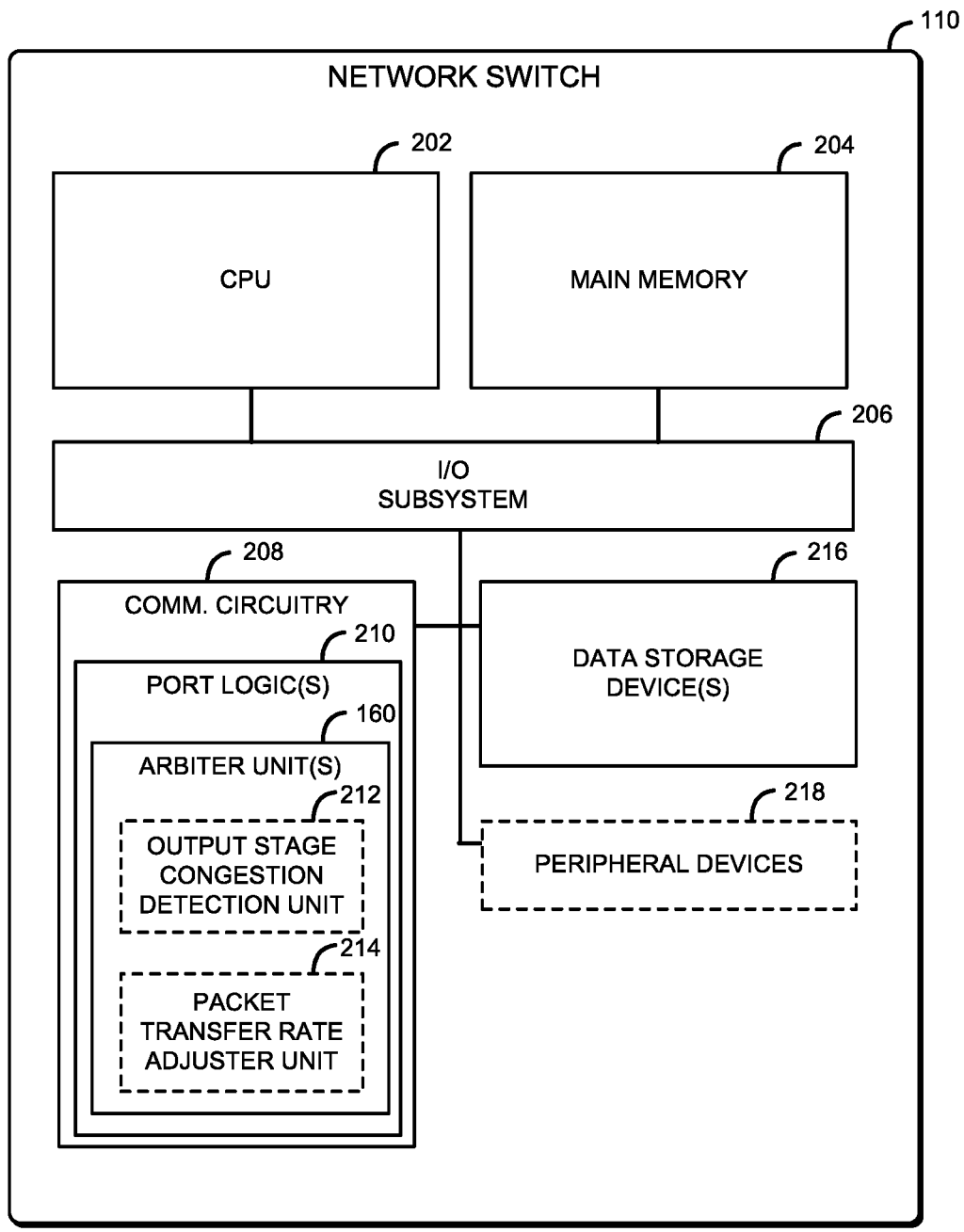
FIG. 2 is a simplified block diagram of at least one embodiment of the network switch of the system of FIG. 2.

Referring now to FIG. 2, the network switch 110 may be embodied as any type of device capable of performing the functions described herein, including receiving multiple flows of packets and detecting whether a sustained incast congestion condition has occurred in the network switch 110 as a function of a condition of the output buffer (e.g., an output buffer 182) of the network switch 110 and a condition of an input buffer (e.g., the input buffer 184) of a downstream network switch (e.g., the network switch 120). For example, in some embodiments, the network switch 110 may be embodied as computer, a multiprocessor system, or a network appliance.

As shown in FIG. 2, the illustrative network switch 110 includes a central processing unit (CPU) 202, a main memory 204, an input/output (I/O) subsystem 206, communication circuitry 208, and one or more data storage devices 216. Of course, in other embodiments, the network switch 110 may include other or additional components, such as those commonly found in a computer (e.g., peripheral devices, a display, etc.). Additionally, in some embodiments, one or more of the illustrative components may be incorporated in, or otherwise form a portion of, another component. For example, in some embodiments, the main memory 204, or portions thereof, may be incorporated in the CPU 202.

The CPU 202 may be embodied as any type of processor or processors capable of performing the functions described herein. As such, the CPU 202 may be embodied as a single or multi-core processor(s), a microcontroller, or other processor or processing/controlling circuit. In some embodiments, the CPU 202 may be embodied as, include, or be coupled to a field programmable gate array (FPGA), an application specific integrated circuit (ASIC), reconfigurable hardware or hardware circuitry, or other specialized hardware to facilitate performance of the functions described herein. The main memory 204 may be embodied as any type of volatile (e.g., dynamic random access memory (DRAM), etc.) or non-volatile memory or data storage capable of performing the functions described herein. In some embodiments, all or a portion of the main memory 204 may be integrated into the CPU 202. In operation, the main memory 204 may store various software and data used during operation such as packet data, remote input buffer fullness information, local output buffer fullness information, operating systems, applications, programs, libraries, and drivers.

The I/O subsystem 206 may be embodied as any circuitry and/or components capable of facilitating input/output operations with the CPU 202, the main memory 204, and other components of the network switch 110. For example, the I/O subsystem 206 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some embodiments, the I/O subsystem 206 may form a portion of a system-on-a-chip (SoC) and be incorporated, along with one or more of the CPU 202, the main memory 204, and other components of the network switch 110, on a single integrated circuit chip.

The communication circuitry 208 may be embodied as any communication circuit, device, or collection thereof, capable of enabling communications over the network 130 between the network switch 110 and another device (e.g., one or more compute devices, another network switch, such as the network switch 120, etc.). The communication circuitry 208 may be configured to use any one or more communication technology (e.g., wired or wireless communications) and associated protocols (e.g., Ethernet, Bluetooth®, Wi-Fi®, WiMAX, etc.) to effect such communication.

The illustrative communication circuitry 208 includes one or more port logics 210, each of which may also be referred to as a network interface controller (NIC). The communication circuitry 208 may be located on silicon separate from the CPU 202, or the communication circuitry 208 may be included in a multi-chip package with the CPU 202, or even on the same die as the CPU 202. The one or more port logics 210 may be embodied as one or more add-in-boards, daughtercards, network interface cards, controller chips, chipsets, specialized components such as a field programmable gate array (FPGA) or application specific integrated circuit (ASIC), or other devices that may be used by the network switch 110 to connect with another device (e.g., a compute device, another network switch, such as the network switch 120, etc.). In some embodiments, one or more port logics 210 may be embodied as part of a system-on-a-chip (SoC) that includes one or more processors, or included on a multichip package that also contains one or more processors. In some embodiments, the one or more port logics 210 may include a local processor (not shown) and/or a local memory (not shown) that are both local to the port logic(s) 210. In such embodiments, the local processor of the port logic(s) 210 may be capable of performing one or more of the functions of the CPU 202 described herein. Additionally or alternatively, in such embodiments, the local memory of the port logic(s) 210 may be integrated into one or more components of the network switch 110 at the board level, socket level, chip level, and/or other levels.

In the illustrative embodiment, the port logic(s) 210 include the arbiter units 160 described above, which may be embodied as any device or circuitry, such as a sub-switch, capable of transferring packets from one or more input streams to a downstream device (e.g., another network switch, such as the network switch 120, or another device). In doing so, the arbiter units 160 are capable of temporarily storing packets in one or more buffers (e.g., one buffer per input stream) and transferring the packets to the downstream device when the buffer of the downstream device has sufficient capacity to temporarily store the packets. The arbiter units 160 may determine whether a downstream device has sufficient capacity to receive one or more packets pursuant to a credit scheme, in which each arbiter unit 160 is allocated a certain number of credits (i.e., a unit of measurement that corresponds to a predefined number of packets, bytes, or other set of data) by the downstream device, spends credits by sending packets to the downstream device, and earns back credits when the downstream device notifies the arbiter unit 160 that the downstream device has sent the packet(s) further downstream, thereby providing space for additional packets.

In the illustrative embodiment, the arbiter unit 170 of the output stage of the network switch 110 includes an output stage congestion detection unit 212 which may be embodied as any device or circuitry (e.g., an ASIC, an FPGA, a co-processor, etc.) capable of determining, as a function of the status (e.g., available capacity) of the input buffer 184 of the downstream network switch 120 and of one or more of the output buffers 182 of arbiter unit 170, whether the network switch 110 is a root of congestion. Additionally, in the illustrative embodiment, each arbiter unit 160 may include a packet transfer rate adjuster unit 214, which may be embodied as any device or circuitry (e.g., an FPGA, an ASIC, a co-processor, etc.) capable of setting the packet transfer rate of the corresponding arbiter unit 160 (e.g., in response to a determination to detect whether the network switch 110 is a root of congestion).

The one or more illustrative data storage devices 216, may be embodied as any type of devices configured for short-term or long-term storage of data such as, for example, memory devices and circuits, memory cards, hard disk drives, solid-state drives, or other data storage devices. Each data storage device 216 may include a system partition that stores data and firmware code for the data storage device 216. Each data storage device 216 may also include an operating system partition that stores data files and executables for an operating system. Additionally, the network switch 110 may include one or more peripheral devices 218. Such peripheral devices 218 may include any type of peripheral device commonly found in a compute device such as a display, speakers, a mouse, a keyboard, and/or other input/output devices, interface devices, and/or other peripheral devices.

The network switch 120 may have components similar to those described in FIG. 2. As such, the description of those components of the network switch 110 is equally applicable to the description of components of the network switch 120 and is not repeated herein for clarity of the description. It should be appreciated the network switch 120 may include other components, sub-components, and devices commonly found in a computing device, which are not discussed above in reference to the network switch 110 and not discussed herein for clarity of the description.

As described above, the network switch 110 and the network switch 120 are illustratively in communication via the network 130, which may be embodied as any type of wired or wireless communication network, including global networks (e.g., the Internet), local area networks (LANs) or wide area networks (WANs), cellular networks (e.g., Global System for Mobile Communications (GSM), 3G, Long Term Evolution (LTE), Worldwide Interoperability for Microwave Access (WiMAX), etc.), digital subscriber line (DSL) networks, cable networks (e.g., coaxial networks, fiber networks, etc.), or any combination thereof.

Figure 3:
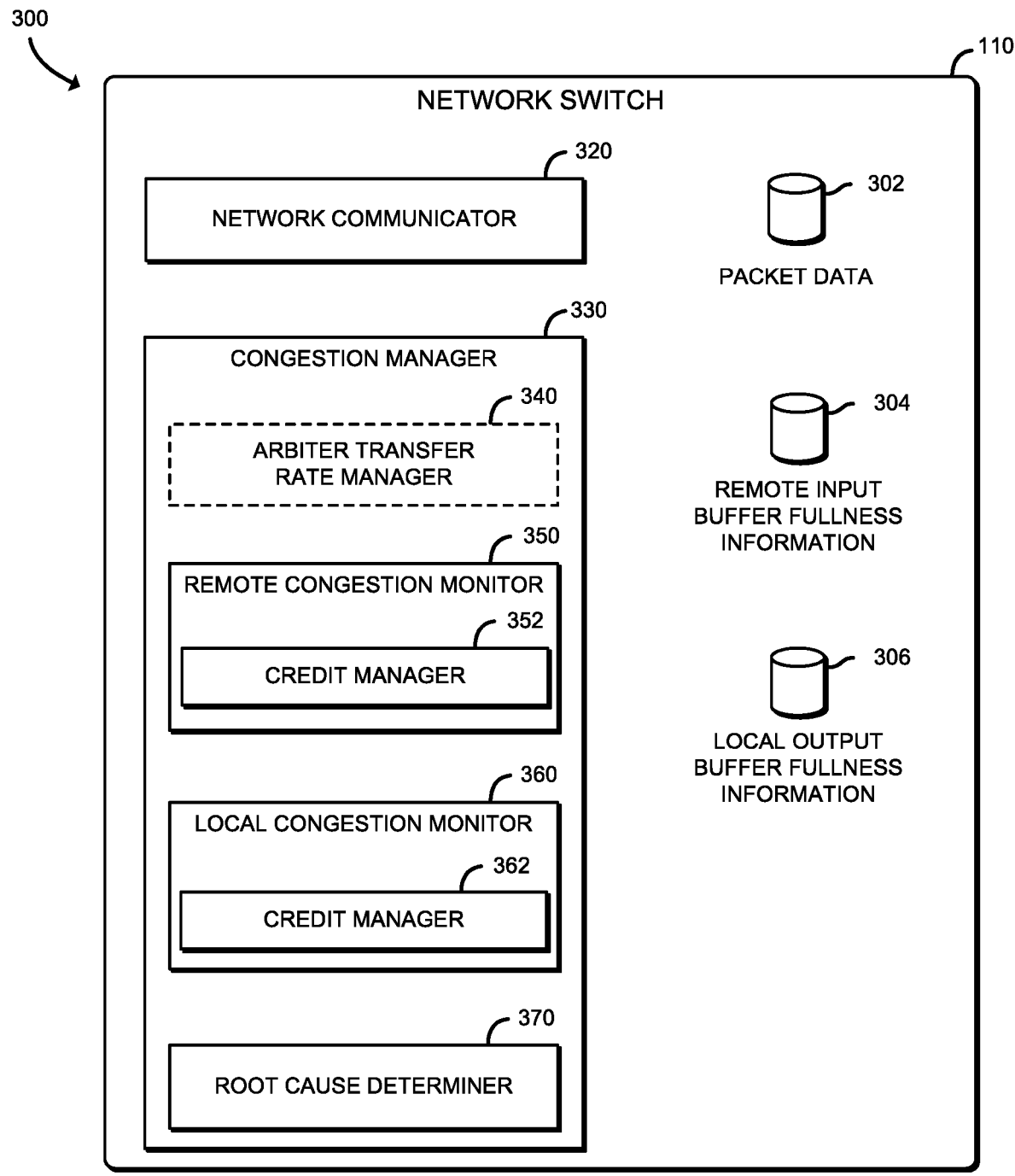
FIG. 3 is a simplified block diagram of at least one embodiment of an environment that may be established by the network switch of FIGS. 1 and 2.

Referring now to FIG. 3, in the illustrative embodiment, the network switch 110 may establish an environment 300 during operation. The illustrative environment 300 includes a network communicator 320 and a congestion manager 330. Each of the components of the environment 300 may be embodied as hardware, firmware, software, or a combination thereof. As such, in some embodiments, one or more of the components of the environment 300 may be embodied as circuitry or a collection of electrical devices (e.g., network communicator circuitry 320, congestion manager circuitry 330, etc.). It should be appreciated that, in such embodiments, one or more of the network communicator circuitry 320 or the congestion manager circuitry 330 may form a portion of one or more of the CPU 202, the main memory 204, the I/O subsystem 206, and/or other components of the network switch 110.

In the illustrative embodiment, the environment 300 includes packet data 302, which may be embodied as any data indicative of packets (e.g., a stream of packets), including payloads and headers (e.g., source address information, destination address information, port information, etc.) transferred from the input streams (e.g., the input streams A, B, C, D of FIG. 1), between the arbiter units 160, and out of the network switch 110 to a downstream device (e.g., the network switch 120). Additionally, in the illustrative embodiment, the environment 300 includes remote input buffer fullness information 304 which may be embodied as any information indicative the available capacity of the downstream device (e.g., available capacity of the input buffer 184, such as a number of credits) to accept packets from the output stage 150 (e.g., the arbiter unit 170) of the network switch 110. Additionally, in the illustrative embodiment, the environment 300 includes local output buffer fullness information 306, which may be embodied as any information indicative of an available capacity (e.g., a number of credits) of the output buffers 182 to accept packets from the upstream stage (e.g., the arbiter units 162, 164, 166, 168 of the input stage 140).

In the illustrative environment 300, the network communicator 320, which may be embodied as hardware, firmware, software, virtualized hardware, emulated architecture, and/or a combination thereof as discussed above, is configured to facilitate inbound and outbound network communications (e.g., network traffic, network packets, network flows, etc.) to and from the network switch 110, respectively. To do so, the network communicator 320 is configured to receive and process data packets (e.g., from one or more compute devices, network switches, or other devices) and to prepare and send data packets to a system or compute device (e.g., another compute device, network switch, or other device). Accordingly, in some embodiments, at least a portion of the functionality of the network communicator 320 may be performed by the communication circuitry 208, and, in the illustrative embodiment, by the port logic(s) 210.

The congestion manager 330, which may be embodied as hardware, firmware, software, virtualized hardware, emulated architecture, and/or a combination thereof as discussed above, is configured to operate the packet transfer rate arbiter units 160 of the stages upstream to the output stage 150 at a rate that is greater than the rate of the arbiter unit 170 in the output stage 150 (e.g., at 1.5× the rate of the arbiter unit 170), determine whether the downstream network switch 120 is experiencing sustained congestion, determine whether the network switch 110 is experiencing sustained congestion at the arbiter unit 170 (e.g., in the output buffers 182), and determine, as a function of the congestion status of the downstream network switch 120 and the network switch 110, whether the network switch 110 is a root of congestion. To do so, in the illustrative embodiment, the congestion manager 330 includes an arbiter transfer rate manager 340, a remote congestion monitor 350, a local congestion monitor 360, and a root cause determiner 370.

The arbiter transfer rate manager 340, in the illustrative embodiment, is configured to set the transfer rate of the arbiter units 160 in the stages (e.g., the stage 140) upstream from the output stage 150 to be greater than the transfer rate of the arbiter unit 170 in the output stage 150. In the illustrative embodiment, the arbiter transfer rate manager 340 sets the transfer rate of the arbiter units 160 in the upstream stages (e.g., the stage 140) to be 1.5 times the transfer rate of the arbiter unit 170 in the output stage 150. As such, packets are transferred by the arbiter units 160 in the upstream stages (e.g., the stage 140) from the input streams (e.g., the input streams A, B, C, D in FIG. 1) to the output buffers 182 of the arbiter unit 170 relatively quickly (e.g., faster than the arbiter unit 170 can transfer the packets out), causing the majority of the packets presently being processed by the network switch 110 to reside in the output buffers 182. As such, a determination of the available capacity of the output buffers 182 provides a highly accurate representation of the number of packets residing in the network switch 110 as a whole. The arbiter transfer rate manager 340 may set the transfer rates as described above in response to a determination by the network switch 110 to detect whether the network switch 110 is a root of congestion. In other embodiments, the arbiter units 160 of the various stages 140, 150 may be configured to operate at fixed transfer rates, rather than adjusting their transfer rates in response to a determination to detect whether the network switch 110 is a root cause of congestion.

The remote congestion monitor 350, in the illustrative embodiment, is configured to determine whether the downstream device (e.g., the network switch 120) is experiencing sustained congestion. In the illustrative embodiment, the remote congestion monitor 350 periodically determines whether the network switch 120 presently has a threshold amount of capacity to accept packets from the present network switch 110 (e.g., capacity to accept at least one packet). If the remote congestion monitor 350 determines that, over a predefined time period or over a predefined number of periodic congestion determinations, that the downstream network switch 120 is congested, then the remote congestion monitor 350 determines that the network switch 120 is experiencing sustained congestion. To determine the available capacity of the network switch 120 to accept packets from the network switch 110, the remote congestion monitor 350 may maintain a model of the input buffer 184, which the remote congestion monitor adjusts as the network switch 110 transfers packets to the network switch 120 (e.g., reducing the available capacity) and as the network switch 110 receives acknowledgement messages or other notifications from the network switch 120 that the packets have been transferred out of the input buffer 184 and further downstream (e.g., increasing the available capacity of the input buffer 184 of the network switch 120). To do so, in the illustrative embodiment, the remote congestion monitor 350 includes a credit manager 352, which is configured to continually decrease or increase a number of credits, representative of the capacity of the input buffer 184 of the network switch 120, in response to the network switch 110 transferring packets to the network switch 120 and the network switch 120 sending notifications to the network switch 110 that those packets have been transferred out of the input buffer 184, as described above. In other embodiments, the fullness of the input buffer 184 may be determined using a different method. For example, the switch 120 may send the fullness information of the input buffer 184 to the switch 110 periodically.

The local congestion monitor 360, in the illustrative embodiment, is configured to determine whether the network switch 110 is experiencing sustained congestion. In the illustrative embodiment, the local congestion monitor 360 periodically determines whether the output buffers 182 presently have a threshold amount of capacity to receive additional packets from the upstream arbiter units (e.g., the arbiter units 162, 164, 166, 168). If the local congestion monitor 360 determines that the output buffers 182 lack the threshold capacity a predefined number of times or over a predefined period of time, the local congestion monitor 360 determines that the network switch 110 is experiencing sustained congestion. In the illustrative embodiment, the local congestion monitor 360 includes a credit manager 362 that continually tracks the available capacity (e.g., number of credits available) for the output buffers 182 of the arbiter unit 170 in the output stage 150 to accept packets from the upstream stage (e.g., the arbiter units 162, 164, 166, 168), increasing the number of available credits as packets are transferred out of the output stage 150 (e.g., to the network switch 120) and decreasing the number of available credits as packets are transferred from the upstream stage 140 to the output stage 150. In some embodiments, due to the shallowness of the local output buffers 182, the local congestion monitor 360 may determine an effective fullness for each of the output buffers 182. In such embodiments, when an output buffer 182 is full (e.g., the first output buffer 182 of FIG. 1), the local congestion monitor 360 estimates and assumes that there are packets being built-up upstream. The local congestion monitor 360, in such embodiments, then not only tracks the actual amount of packets in the output buffer 182, but also maintains a separate counter of an estimated build-up of packets upstream, for every clock cycle that the output buffer 182 is determined to be full. Depending on the embodiment, the local congestion monitor 360 may use either the actual fullness or the effective fullness of each output buffer 182.

Having determined an effective fullness for each output buffer 182, the local congestion monitor 360 may determine whether there is temporary local congestion at the arbiter unit 170 by determining whether either of the following conditions is true: i) the effective fullness of any one of the output buffers 182 exceeds a predefined threshold or ii) the effective fullness of all of the output buffers 182 exceeds a predefined threshold. The two predefined thresholds may be different. When a sustained congestion period expires, the local congestion monitor 360 may re-estimate the effective fullness of each output buffer 182 by clearing a estimated upstream fullness count. If the local output buffer 182 (e.g., the first output buffer 182) is still full, the local congestion monitor 360 will start incrementing the estimated upstream fullness count during the new period. However, when a predefined period expires, if the output buffer 182 is no longer full, the local congestion monitor 360 will clear the estimated upstream fullness count.

The root cause determiner 370, in the illustrative embodiment, is configured to determine whether the network switch 110 is a root of congestion in the network 130 as a function of the congestion status of the remote input buffer 184 of the downstream network switch 120 and of the output buffers 182 of the network switch 110. In doing so, the root cause determiner 370 is configured to determine that the network switch 110 is a root of congestion if the remote congestion monitor 350 has determined that the network switch 120 is not experiencing sustained congestion (e.g., at the input buffer 184) and the local congestion monitor 360 has determined that the network switch 110 is experiencing sustained congestion (e.g., at the output buffers 182). In other embodiments, the root cause determiner 370 may determine that the network switch 110 is the root cause of congestion when both local and remote sustained congestion are encountered.

It should be appreciated that each of the arbiter transfer rate manager 340, the remote congestion monitor 350, the credit manager 352, the local congestion monitor 360, the credit manager 362, and the root cause determiner 370 may be separately embodied as hardware, firmware, software, virtualized hardware, emulated architecture, and/or a combination thereof. For example, the arbiter transfer rate manager 340 may be embodied as a hardware component, while each of the remote congestion monitor 350, the credit manager 352, the local congestion monitor 360, the credit manager 362, and the root cause determiner 370 is embodied as a virtualized hardware component or as some other combination of hardware, firmware, software, virtualized hardware, emulated architecture, and/or a combination thereof.

Figure 4:
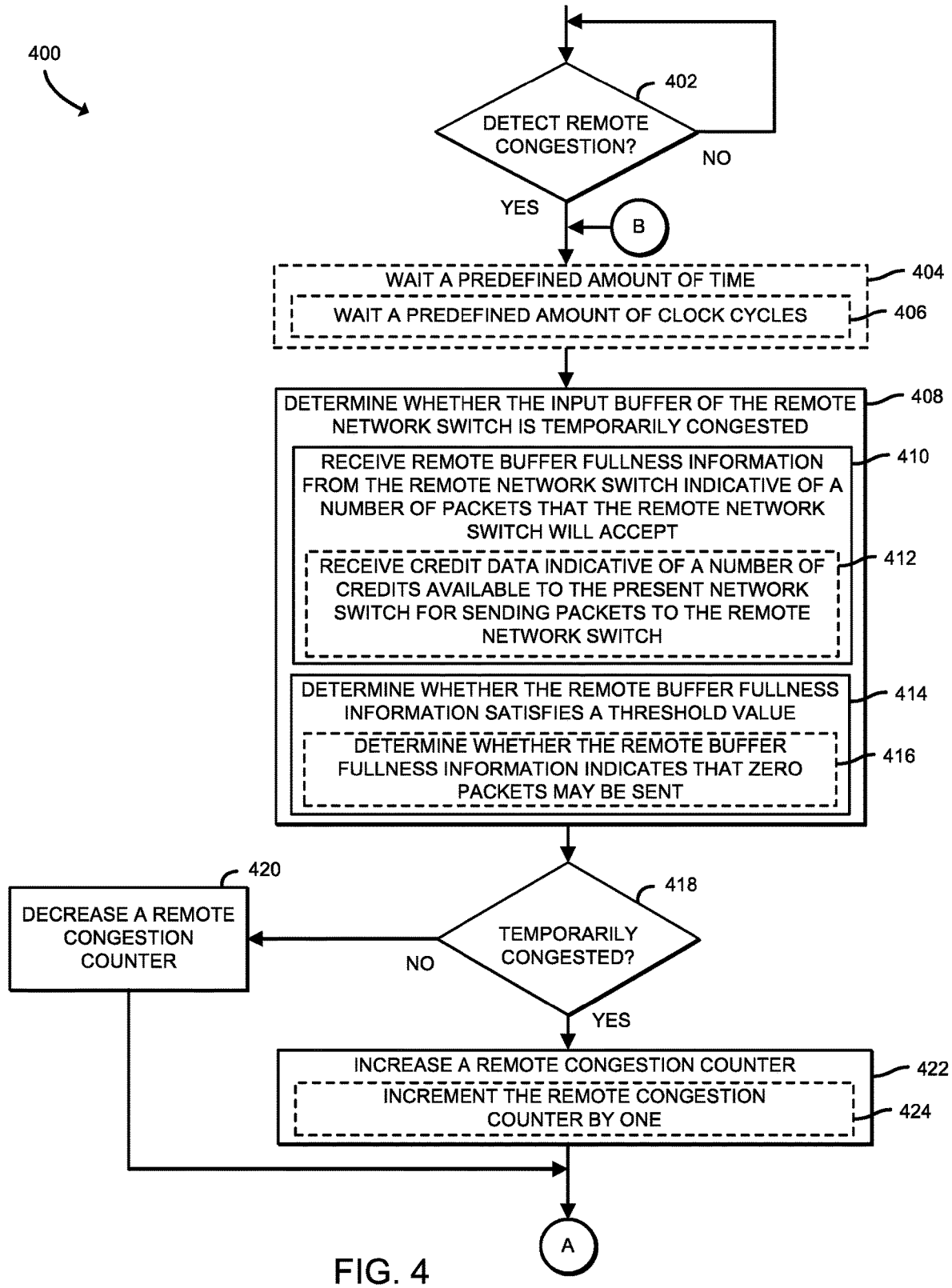
FIGS. 4-5 are a simplified block diagram of at least one embodiment of a method for detecting remote congestion that may be performed by the network switch of FIGS. 1 and 2.

Referring now to FIG. 4, in use, the network switch 110 may execute a method 400 for detecting remote congestion (e.g., congestion in the downstream network switch 120). The method 400 begins with block 402, in which the network switch 110 determines whether to detect remote congestion. In doing so, the network switch 110 may determine whether a request from a remote compute device (not shown), such as from an administrator compute device, has been received to detect remote congestion as part of a request to determine whether the network switch 110 is a root of congestion. In other embodiments, the network switch 110 may determine to detect remote congestion in response to detecting a corresponding setting in a configuration file (e.g., a configuration file stored in a data storage device 216). In other embodiments, the network switch 110 may determine to detect remote congestion in response to a determination that the network switch 110 is powered on and communicatively connected to a downstream device (e.g., the network switch 120), and/or based on other factors. Regardless, in response to a determination to detect remote congestion, the method 400 advances to block 404, in which the network switch 110 may wait a predefined amount of time. In doing so, the network switch 110 may wait a predefined number of clock cycles, as indicated in block 406.

In block 408, the network switch 110 determines whether the input buffer 184 of the remote network switch (e.g., the downstream network switch 120) is temporarily congested. In doing so, in the illustrative embodiment, the network switch 110 receives remote input buffer fullness information (e.g., the remote input buffer fullness information 304) from the remote network switch (e.g., the network switch 120) indicative of a number of packets that the remote network switch 120 will accept from the network switch 110, as indicated in block 410. In the illustrative embodiment, the network switch 110 receives credit data indicative of a number of credits available to the network switch 110 for sending packets to the remote network switch 120, as indicated in block 412. Additionally, in determining whether the input buffer 184 of the remote network switch 120 is temporarily congested, the network switch 110 determines whether the remote input buffer fullness information 304 satisfies a threshold value (e.g., indicates that less than a threshold number of bytes are available to receive packets from the network switch 110), as indicated in block 414. In doing so, the network switch 110 may determine whether the remote input buffer fullness information 304 indicates that zero packets may be sent (e.g., there are no credits available for sending packets to the remote network switch 120), as indicated in block 416.

In block 418, the network switch 110 determines the subsequent actions to perform as a function of whether the remote network switch 120 is temporarily congested. In response to a determination that the remote network switch 120 is not temporarily congested, the method 400 advances to block 420, in which the network switch 110 decreases a remote congestion counter (e.g., a local variable indicative of a number of times the remote network switch 120 has been determined to be congested). In the illustrative embodiment, if the remote congestion counter is zero, then the network switch 110 maintains the value at zero in block 420 (e.g., rather than reducing the value to a negative number). In some embodiments, in decreasing the remote congestion counter, the network switch 110 sets the remote congestion counter to zero, regardless of what value the remote congestion counter was before. Referring back to block 418, if the network switch 110 instead determines that the remote network switch 120 is temporarily congested, the method 400 advances to block 422, in which the network switch 110 increases the remote congestion counter. In doing so, in the illustrative embodiment, the network switch 110 increments the remote congestion counter by one, as indicated in block 424. In other embodiments, the network switch 110 may increment the remote congestion counter by a different value (e.g., an amount of time that has elapsed since the remote network switch 120 was last determined to be temporarily congested). Subsequently, the method 400 advances to block 426 of FIG. 5, in which the network switch 110 determines whether the input buffer 184 of the remote network switch 120 has sustained congestion.

Figure 5:
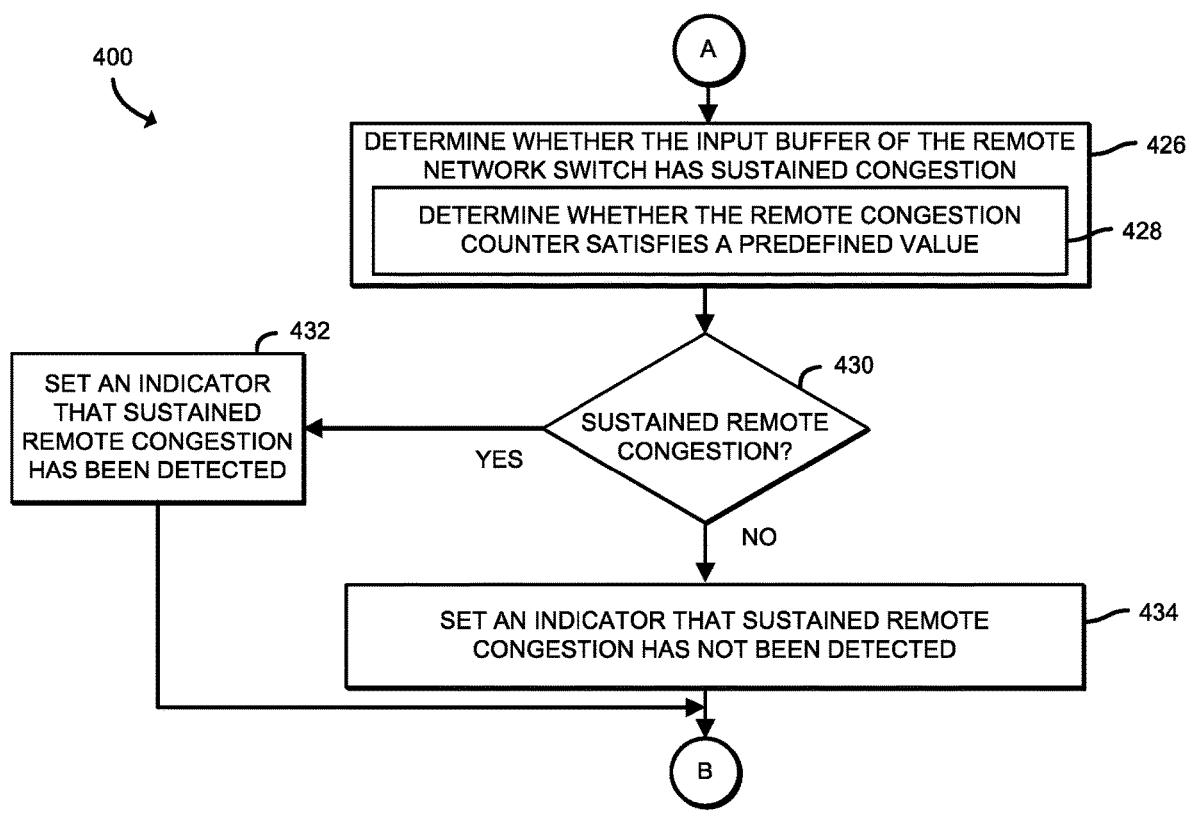

Referring now to FIG. 5, in determining whether the input buffer 184 of the remote network switch 120 has sustained congestion, the network switch 110 determines whether the remote congestion counter satisfies predefined value (e.g., a predefined number of times the remote network switch 120 has been determined to be congested, a predefined amount of time during which the remote network switch 120 has been congested, etc.), as indicated in block 428. Afterwards, the method 400 advances to block 430, in which the network switch 110 determines the subsequent actions to perform as a function of whether the network switch 110 determined whether the remote network switch 120 is experiencing sustained congestion. In response to a determination that the remote network switch 120 is experiencing sustained congestion, the method 400 advances to block 432, in which the network switch 110 sets an indicator (e.g., in the memory 204) that sustained remote congestion has been detected. Afterwards, the method 400 loops back to block 404 in which the network switch 110 again waits a predefined amount of time and then determines whether the input buffer 184 of the remote network switch 120 is temporarily congested.

Referring back to block 430, if the network switch 110 instead determines that the remote network switch 120 is not presently experiencing sustained congestion, the method 400 advances to block 434 in which the network switch 110 sets an indicator (e.g., in the memory 204) that sustained remote congestion has not been detected. Subsequently, the method 400 loops back to block 404 of FIG. 4, in which the network switch 110 again waits a predefined amount of time and then determines whether the input buffer 184 of the remote network switch 120 is temporarily congested.

Figure 6:
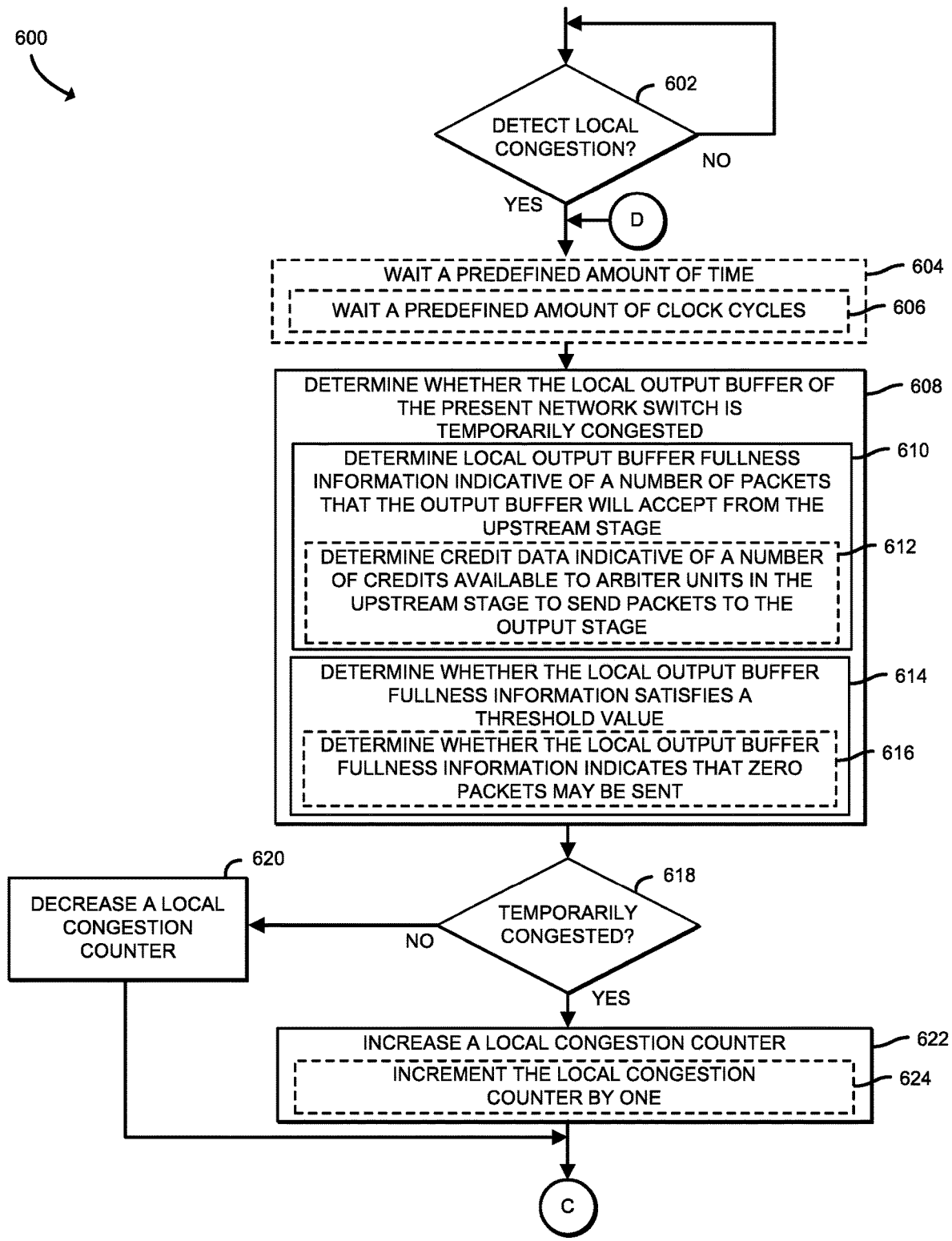
FIGS. 6-7 are a simplified block diagram of at least one embodiment of a method for detecting local congestion that may be performed by the network switch of FIGS. 1 and 2.

Referring now to FIG. 6, in use, the network switch 110 may execute a method 600 for detecting local congestion. The method 600 begins with block 602, in which the network switch 110 determines whether to detect local congestion. In doing so, the network switch 110 may determine whether a request from a remote compute device (not shown), such as from an administrator compute device, has been received to detect local congestion as part of a request to determine whether the network switch 110 is a root of congestion. In other embodiments, the network switch 110 may determine to detect local congestion in response to detecting a corresponding setting in a configuration file (e.g., a configuration file stored in a data storage device 216). In other embodiments, the network switch 110 may determine to detect local congestion in response to a determination that the network switch 110 is powered on and communicatively connected to one or more other devices, and/or based on other factors. Regardless, in response to a determination to detect local congestion, the method 600 advances to block 604, in which the network switch 110 may wait a predefined amount of time. In doing so, as indicated in block 606, the network switch 110 may wait a predefined amount of clock cycles.

In block 608, the network switch 110 determines whether each local output buffer 182 of the network switch 110 is temporarily congested. In doing so, in the illustrative embodiment, the network switch 110 determines local output buffer fullness information (e.g., the local output buffer fullness information 306) indicative of a number of packets that each output buffer 182 will accept from the upstream stage (e.g., the stage 140), as indicated in block 610. In doing so, the network switch 110 determines credit data indicative of a number of credits available to arbiter units (e.g., the arbiter units 162, 164, 166, 168) in the upstream stage 140 to send packets to the output stage 150, as indicated in block 612. Additionally, in determining whether each local output buffer 182 of the network switch 110 is experiencing temporary congestion, the network switch 110 determines whether the local output buffer fullness information 306 satisfies a predefined threshold value, as indicated in block 614. In doing so, the network switch 110 may determine whether the local output buffer fullness information 306 indicates that no packets may be sent one of the output buffers 182, as indicated in block 616. As described above, with reference to FIG. 3, in other embodiments, the network switch 110 may determine whether the network switch 110 is experiencing temporary congestion by determining an effective fullness for each output buffer 182 and determining whether either of the following conditions is true: i) the effective fullness of any one of the output buffers 182 exceeds a predefined threshold or ii) the effective fullness of all of the output buffers 182 exceeds a predefined threshold. The two predefined thresholds may be different.

The method 600 subsequently advances to block 618 in which the network switch 110 determines the subsequent actions to perform as a function of whether the network switch 110 determined that a local output buffer 182 is temporarily congested. In response to a determination that no local output buffer 182 is temporarily congested, the method 600 advances to block 620, in which the network switch 110 decreases a local congestion counter. In doing so, in the illustrative embodiment, if the local congestion counter is zero, then the network switch 110 maintains the value at zero in block 620 (e.g., rather than reducing the local congestion count to a negative number). In some embodiments, in decreasing the local congestion counter, the network switch 110 sets the local congestion counter to zero, regardless of what value the local congestion counter was before. Referring back to block 618, if the network switch 110 instead determines that any of the local output buffers 182 is temporarily congested, the method 600 advances to block 622 in which the network switch 110 increases the local congestion counter. In doing so, the network switch 110 may increase the local congestion counter by one, as indicated in block 624. In other embodiments, the network switch 110 may increase the local congestion counter by an amount of time that has elapsed since a local output buffer 182 was previously determined to be temporarily congested. In other embodiments, the network switch 110 may increase the local congestion counter by another amount. Afterwards, the method 600 advances to block 626 of FIG. 7, in which the network switch 110 determines whether one or more of the local output buffers 182 of the network switch 110 has sustained congestion.

Figure 7:
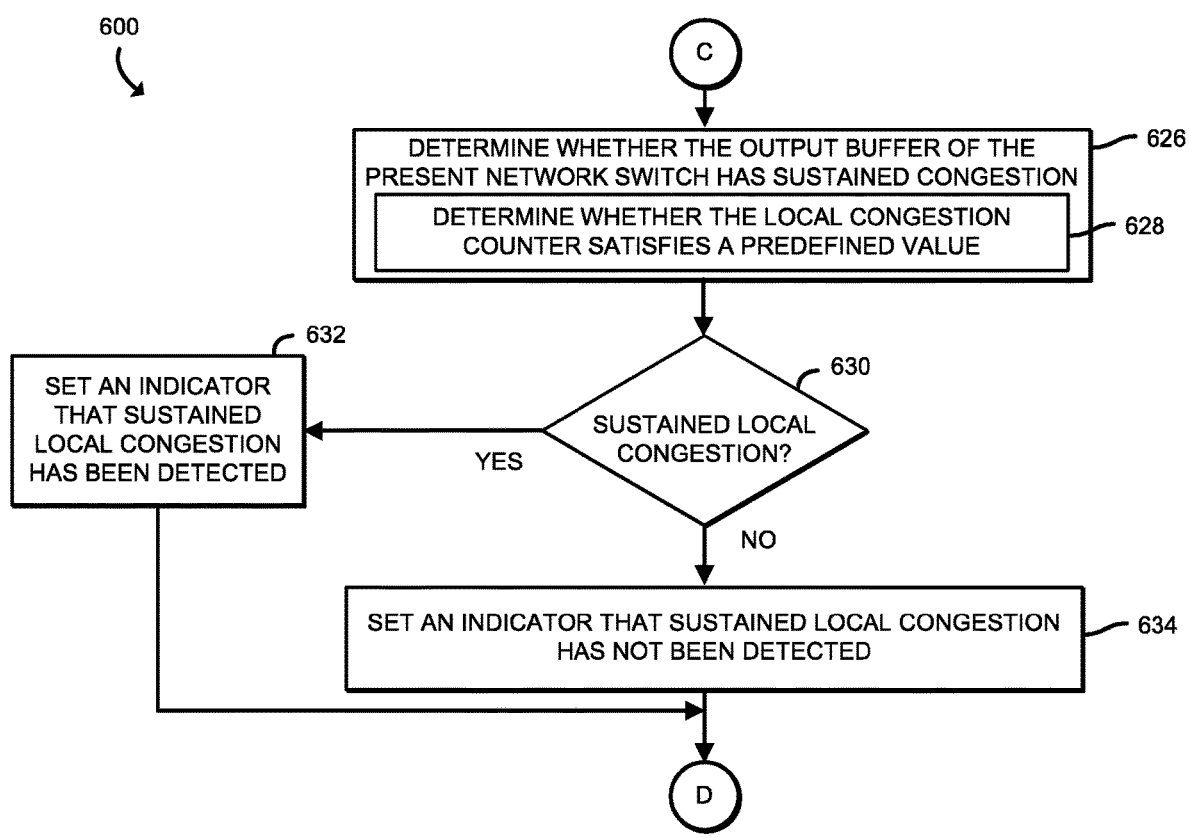

Referring now to FIG. 7, in determining whether one or more of the local output buffers 182 of the network switch 110 has sustained congestion, the network switch 110 determines whether the local congestion counter satisfies a predefined value (e.g., a predefined number of times the network switch 110 has been determined to be congested, a predefined amount of time during which the network switch 110 has been congested, etc.), as indicated in block 628. In some embodiments, (e.g., in embodiments in which an effective fullness is determined) the network switch 110 may re-estimate the effective fullness of each output buffer 182 when a sustained congestion period expires, by clearing an estimated upstream fullness count. If the local output buffer 182 (e.g., the first output buffer 182) is still full, network switch 110 may start incrementing the estimated upstream fullness count during the new period. However, when a predefined period expires, if the output buffer 182 is no longer full, the network switch 110 may clear the estimated upstream fullness count.

Subsequently, the method 600 advances to block 630, in which the network switch 110 determines the subsequent actions to perform as a function of whether sustained local congestion was detected. In response to a determination that the network switch 110 has sustained local congestion, the method 600 advances to block 632 in which the network switch 110 sets an indicator (e.g., in the memory 204) that sustained local congestion has been detected. Subsequently, the method 600 loops back to block 604 of FIG. 6, in which the network switch 110 waits a predefined amount of time and subsequently determines again whether one or more of the local output buffers 182 is temporarily congested. Referring back to block 630, if the network switch 110 instead determines that sustained local congestion has not been detected, the method 600 advances to block 634 in which the network switch 110 sets an indicator (e.g., in the memory 204) that sustained local congestion has not been detected.

Subsequently, the method 600 loops back to block 604 of FIG. 6, in which the network switch 110 waits a predefined amount of time and subsequently determines again whether one or more of the local output buffers 182 is temporarily congested.

Figure 8:
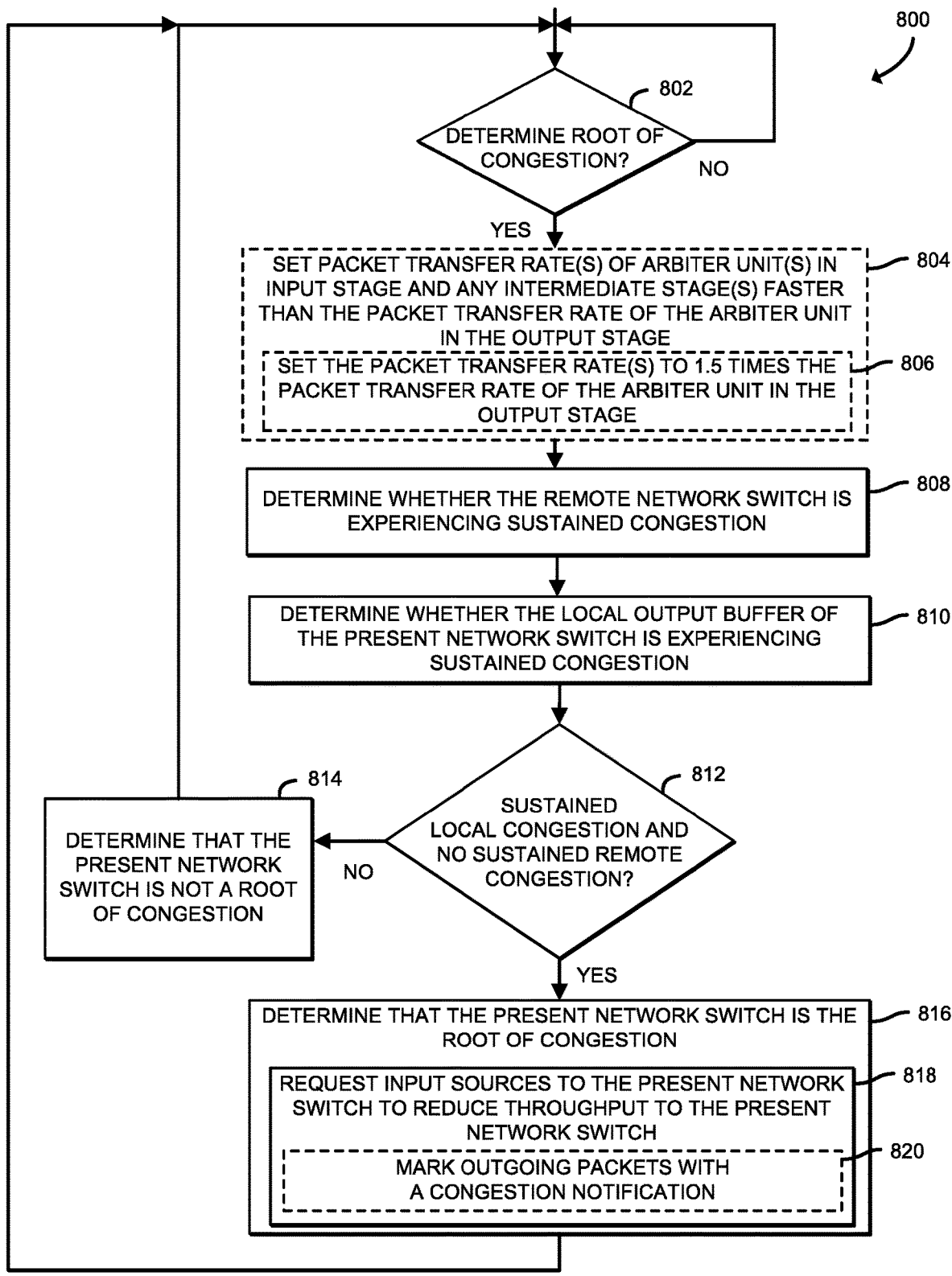
FIG. 8 is a simplified block diagram of at least one embodiment of a method for determining a root of congestion that may be performed by the network switch of FIGS. 1 and 2.

Referring now to FIG. 8, in use, the network switch 110 may execute a method 800 for determining whether the network switch 110 is a root of congestion. The method 800 begins with block 802, in which the network switch 110 determines whether to determine if the network switch 110 is a root of congestion in the network 130. In doing so, the network switch 110 may determine whether a request from a remote compute device (not shown), such as from an administrator compute device, has been received to determine whether the network switch 110 is a root of congestion. In other embodiments, the network switch 110 may determine to perform the determination in response to detecting a corresponding setting in a configuration file (e.g., a configuration file stored in a data storage device 216). In other embodiments, the network switch 110 may determine to perform the method 800 if the network switch 110 is powered on and communicatively connected to other devices, and/or based on other factors. Regardless, in response to a determination to detect whether the network switch 110 is a root of congestion, the method 800 advances to block 804. In block 804, the network switch 110 may set packet transfer rates of the arbiter units 160 in the input stage 140 and any intermediate stages to be faster (e.g., greater than) the transfer rate of the arbiter unit 170 in the output stage 150. In doing so, the network switch 110 may set the transfer rates to be 1.5 times the transfer rate of the arbiter unit 170 in the output stage 150, as indicated in block 806. In other embodiments, the transfer rates of the arbiter units 160 are fixed at the rates described above, rather than being adjusted in response to a determination to perform the method 800. Subsequently, in block 808, the network switch 110 determines whether the remote network switch (e.g., the downstream network switch 120) is experiencing sustained congestion. In doing so, the network switch 110 performs the method 400, described above with reference to FIGS. 4-5. Additionally, in block 810, the network switch 110 determines whether any local output buffer 182 of the present network switch 110 is experiencing sustained congestion. As such, in the illustrative embodiment, the network switch 110 performs the method 600, described above with reference to FIGS. 6-7. In some embodiments, the network switch 110 may perform blocks 808 and 810 concurrently, such as in separate threads. Regardless, in block 812, the network switch 110 determines whether the network switch 110 is experiencing sustained local congestion (e.g., one or more local output buffers 182 is experiencing sustained congestion) and the remote network switch (e.g., the downstream network switch 120) is not experiencing sustained congestion. If not, the method 800 advances to block 814 in which the network switch 110 determinates that the network switch 110 is not a root of congestion. Subsequently, the method 800 loops back to block 802, in which the network switch 110 again determines whether to detect if the network switch 110 is a root of congestion. Referring back to block 812, if the network switch 110 instead determines that there is sustained local congestion and no sustained remote congestion, the method 800 advances to block 816, in which the network switch 110 determines that the network switch 110 is the root of congestion. In doing so, the network switch 110 may request input sources (e.g., compute devices providing the input streams A, B, C, D of FIG. 1) to reduce throughput to the network switch 110. In the illustrative embodiment, the network switch 110 makes the request by marking outgoing packets with a congestion notification indicating that the throughput to the network switch 110 should be reduced. In other embodiments, the network switch 110 instead determines that the present network switch 110 is the root of congestion when both the downstream network switch 120 and the present network switch 110 are encountering sustained congestion.

EXAMPLES

Illustrative examples of the technologies disclosed herein are provided below. An embodiment of the technologies may include any one or more, and any combination of, the examples described below.

Example 1 includes a network switch for determining a root of congestion, the network switch comprising a plurality of arbiter units configured in a hierarchy of stages, wherein the hierarchy includes an output stage and an upstream stage; circuitry to operate the arbiter units in the upstream stage at a packet transfer rate that is greater than a packet transfer rate of the arbiter unit in the output stage; determine whether an input buffer of a remote network switch in communication with the arbiter unit in the output stage has sustained congestion indicative of an inability to transfer packets from the arbiter unit in the output stage over a first predefined time period; determine whether an output buffer of the arbiter unit in the output stage has sustained congestion indicative of an inability to transfer packets from one or more arbiter units in the upstream stage over a second predefined time period; determine, as a function of whether the input buffer of the remote network switch has sustained congestion and whether the output buffer of the arbiter unit in the output stage has sustained congestion, whether the network switch is a root of congestion; and request, in response to a determination that the network switch is the root of congestion, that one or more input sources to the network switch reduce a throughput to the network switch.

Example 2 includes the subject matter of Example 1, and wherein the circuitry is further to determine, in response to a determination that the output buffer of the arbiter unit in the output stage does not have sustained congestion, that the network switch is not a root of congestion.

Example 3 includes the subject matter of any of Examples 1 and 2, and wherein to determine whether the input buffer of the remote network switch has sustained congestion comprises to determine whether the remote network switch has temporary congestion a predefined number of times; and determine, in response to a determination that the remote network switch has temporary congestion the predefined number of times, that the remote network switch has sustained congestion.

Example 4 includes the subject matter of any of Examples 1-3, and wherein the circuitry is further to wait a predefined amount of time between each determination of whether the remote network switch has temporary congestion.

Example 5 includes the subject matter of any of Examples 1-4, and wherein to determine whether the remote network switch has temporary congestion comprises to receive remote input buffer fullness information indicative of a number of packets that the remote network switch will accept from the network switch; determine whether the remote input buffer fullness information satisfies a threshold value; and determine, in response to a determination that the remote input buffer fullness information satisfies the threshold value, that the remote network switch has temporary congestion.

Example 6 includes the subject matter of any of Examples 1-5, and wherein to determine whether the remote buffer data satisfies a threshold value comprises to determine whether the remote input buffer fullness information indicates that the remote network switch will accept zero packets from the network switch.

Example 7 includes the subject matter of any of Examples 1-6, and wherein to determine whether an input buffer of a remote network switch in communication with the arbiter unit in the output stage has sustained congestion comprises to receive credit data indicative of a number of packets that the remote network switch will accept.

Example 8 includes the subject matter of any of Examples 1-7, and wherein to determine whether an output buffer of the arbiter unit in the output stage has sustained congestion comprises to determine whether the output buffer has temporary congestion a predefined number of times; and determine, in response to a determination that the output buffer has temporary congestion over the predefined number of times, that the output buffer has sustained congestion.

Example 9 includes the subject matter of any of Examples 1-8, and wherein the circuitry is further to wait a predefined amount of time between each determination of whether the output buffer has temporary congestion.

Example 10 includes the subject matter of any of Examples 1-9, and wherein to determine whether the output buffer has temporary congestion comprises to determine local output buffer fullness information indicative of a number of packets that the arbiter unit in the output stage will accept from the upstream stage; determine whether the local output buffer fullness information satisfies a threshold value; and determine, in response to a determination that the local output buffer fullness information satisfies the threshold value, that the output buffer has temporary congestion.

Example 11 includes the subject matter of any of Examples 1-10, and wherein to determine whether the local output buffer fullness information satisfies a threshold value comprises to determine whether the local output buffer fullness information indicates that the arbiter unit in the output stage will accept zero packets from the upstream stage.

Example 12 includes the subject matter of any of Examples 1-11, and wherein to determine whether the output buffer has temporary congestion comprises to determine effective fullness information indicative of an estimated build-up of packets upstream to the output buffer; and determine whether the output buffer has temporary congestion as a function of the effective fullness information.

Example 13 includes a method for determining a root of congestion, the method comprising operating, by a network switch that includes a plurality of arbiter units configured in a hierarchy of stages including an output stage and an upstream stage, the arbiter units in the upstream stage at a packet transfer rate that is greater than a packet transfer rate of the arbiter unit in the output stage; determining, by the network switch, whether an input buffer of a remote network switch in communication with the arbiter unit in the output stage has sustained congestion indicative of an inability to transfer packets from the arbiter unit in the output stage over a first predefined time period; determining, by the network switch, whether an output buffer of the arbiter unit in the output stage has sustained congestion indicative of an inability to transfer packets from one or more arbiter units in the upstream stage over a second predefined time period; determining, by the network switch and as a function of whether the input buffer of the remote network switch has sustained congestion and whether the output buffer of the arbiter unit in the output stage has sustained congestion, whether the network switch is a root of congestion; and requesting, in response to a determination that the network switch is the root of congestion, that one or more input sources to the network switch reduce a throughput to the network switch.

Example 14 includes the subject matter of Example 13, and further including determining, by the network switch and in response to a determination that the output buffer of the arbiter unit in the output stage does not have sustained congestion, that the network switch is not a root of congestion.

Example 15 includes the subject matter of any of Examples 13 and 14, and wherein determining whether the input buffer of the remote network switch has sustained congestion comprises determining whether the remote network switch has temporary congestion a predefined number of times; and determining, in response to a determination that the remote network switch has temporary congestion the predefined number of times, that the remote network switch has sustained congestion.

Example 16 includes the subject matter of any of Examples 13-15, and further including waiting, by the network switch, a predefined amount of time between each determination of whether the remote network switch has temporary congestion.

Example 17 includes the subject matter of any of Examples 13-16, and wherein determining whether the remote network switch has temporary congestion comprises receiving remote input buffer fullness information indicative of a number of packets that the remote network switch will accept from the network switch; determining whether the remote input buffer fullness information satisfies a threshold value; and determining, in response to a determination that the remote input buffer fullness information satisfies the threshold value, that the remote network switch has temporary congestion.

Example 18 includes the subject matter of any of Examples 13-17, and wherein determining whether the remote input buffer fullness information satisfies a threshold value comprises determining whether the remote input buffer fullness information indicates that the remote network switch will accept zero packets from the network switch.

Example 19 includes the subject matter of any of Examples 13-18, and wherein determining whether an input buffer of a remote network switch in communication with the arbiter unit in the output stage has sustained congestion comprises receiving credit data indicative of a number of packets that the remote network switch will accept.

Example 20 includes the subject matter of any of Examples 13-19, and wherein determining whether an output buffer of the arbiter unit in the output stage has sustained congestion comprises determining whether the output buffer has temporary congestion a predefined number of times; and determining, in response to a determination that the output buffer has temporary congestion over the predefined number of times, that the output buffer has sustained congestion.

Example 21 includes the subject matter of any of Examples 13-20, and further including waiting, by the network switch, a predefined amount of time between each determination of whether the output buffer has temporary congestion.

Example 22 includes the subject matter of any of Examples 13-21, and wherein determining whether the output buffer has temporary congestion comprises determining, by the network switch, local output buffer fullness information indicative of a number of packets that the arbiter unit in the output stage will accept from the upstream stage;

determining, by the network switch, whether the local output buffer fullness information satisfies a threshold value; and determining, by the network switch and in response to a determination that the local output buffer fullness information satisfies the threshold value, that the output buffer has temporary congestion.

Example 23 includes the subject matter of any of Examples 13-22, and wherein determining whether the local output buffer fullness information satisfies a threshold value comprises determining whether the local output buffer fullness information indicates that the arbiter unit in the output stage will accept zero packets from the upstream stage.

Example 24 includes the subject matter of any of Examples 13-23, and wherein determining whether the output buffer has temporary congestion comprises determining effective fullness information indicative of an estimated build-up of packets upstream to the output buffer; and determining whether the output buffer has temporary congestion as a function of the effective fullness information.

Example 25 includes one or more machine-readable storage media comprising a plurality of instructions stored thereon that, in response to being executed, cause a network switch to perform the method of any of Examples 13-24.

Example 26 includes a network switch to determine a root of congestion, the network switch comprising one or more processors; one or more memory devices having stored therein a plurality of instructions that, when executed by the one or more processors, cause the network switch to perform the method of any of Examples 13-24.

Example 27 includes a network switch comprising means for performing the method of any of Examples 13-24.

Example 28 includes a network switch for determining a root of congestion, the network switch comprising a plurality of arbiter units configured in a hierarchy of stages, wherein the hierarchy includes an output stage and an upstream stage; congestion manager circuitry to operate the arbiter units in the upstream stage at a packet transfer rate that is greater than a packet transfer rate of the arbiter unit in the output stage; determine whether an input buffer of a remote network switch in communication with the arbiter unit in the output stage has sustained congestion indicative of an inability to transfer packets from the arbiter unit in the output stage over a first predefined time period; determine whether an output buffer of the arbiter unit in the output stage has sustained congestion indicative of an inability to transfer packets from one or more arbiter units in the upstream stage over a second predefined time period; determine, as a function of whether the input buffer of the remote network switch has sustained congestion and whether the output buffer of the arbiter unit in the output stage has sustained congestion, whether the network switch is a root of congestion; and request, in response to a determination that the network switch is the root of congestion, that one or more input sources to the network switch reduce a throughput to the network switch.

Example 29 includes the subject matter of Example 28, and wherein the congestion manager circuitry is further to determine, in response to a determination that the output buffer of the arbiter unit in the output stage does not have sustained congestion, that the network switch is not a root of congestion.

Example 30 includes the subject matter of any of Examples 28 and 29, and wherein to determine whether the input buffer of the remote network switch has sustained congestion comprises to determine whether the remote network switch has temporary congestion a predefined number of times; and determine, in response to a determination that the remote network switch has temporary congestion the predefined number of times, that the remote network switch has sustained congestion.

Example 31 includes the subject matter of any of Examples 28-30, and wherein the congestion manager circuitry is further to wait a predefined amount of time between each determination of whether the remote network switch has temporary congestion.

Example 32 includes the subject matter of any of Examples 28-31, and wherein to determine whether the remote network switch has temporary congestion comprises to receive remote input buffer fullness information indicative of a number of packets that the remote network switch will accept from the network switch; determine whether the remote input buffer fullness information satisfies a threshold value; and determine, in response to a determination that the remote input buffer fullness information satisfies the threshold value, that the remote network switch has temporary congestion.

Example 33 includes the subject matter of any of Examples 28-32, and wherein to determine whether the remote buffer data satisfies a threshold value comprises to determine whether the remote input buffer fullness information indicates that the remote network switch will accept zero packets from the network switch.

Example 34 includes the subject matter of any of Examples 28-33, and wherein to determine whether an input buffer of a remote network switch in communication with the arbiter unit in the output stage has sustained congestion comprises to receive credit data indicative of a number of packets that the remote network switch will accept.

Example 35 includes the subject matter of any of Examples 28-34, and wherein to determine whether an output buffer of the arbiter unit in the output stage has sustained congestion comprises to determine whether the output buffer has temporary congestion a predefined number of times; and determine, in response to a determination that the output buffer has temporary congestion over the predefined number of times, that the output buffer has sustained congestion.

Example 36 includes the subject matter of any of Examples 28-35, and wherein the congestion manager circuitry is further to wait a predefined amount of time between each determination of whether the output buffer has temporary congestion.

Example 37 includes the subject matter of any of Examples 28-36, and wherein to determine whether the output buffer has temporary congestion comprises to determine local output buffer fullness information indicative of a number of packets that the arbiter unit in the output stage will accept from the upstream stage; determine whether the local output buffer fullness information satisfies a threshold value; and determine, in response to a determination that the local output buffer fullness information satisfies the threshold value, that the output buffer has temporary congestion.

Example 38 includes the subject matter of any of Examples 28-37, and wherein to determine whether the local output buffer fullness information satisfies a threshold value comprises to determine whether the local output buffer fullness information indicates that the arbiter unit in the output stage will accept zero packets from the upstream stage.

Example 39 includes the subject matter of any of Examples 28-38, and wherein to determine whether the output buffer has temporary congestion comprises to determine effective fullness information indicative of an estimated build-up of packets upstream to the output buffer; and determine whether the output buffer has temporary congestion as a function of the effective fullness information.

Example 40 includes a network switch for determining a root of congestion, the network switch comprising circuitry for operating, a plurality of arbiter units configured in a hierarchy of stages including an output stage and an upstream stage, the arbiter units in the upstream stage at a packet transfer rate that is greater than a packet transfer rate of the arbiter unit in the output stage; means for determining whether an input buffer of a remote network switch in communication with the arbiter unit in the output stage has sustained congestion indicative of an inability to transfer packets from the arbiter unit in the output stage over a first predefined time period; means for determining whether an output buffer of the arbiter unit in the output stage has sustained congestion indicative of an inability to transfer packets from one or more arbiter units in the upstream stage over a second predefined time period; means for determining, as a function of whether the input buffer of the remote network switch has sustained congestion and whether the output buffer of the arbiter unit in the output stage has sustained congestion, whether the network switch is a root of congestion; and circuitry for requesting, in response to a determination that the network switch is the root of congestion, that one or more input sources to the network switch reduce a throughput to the network switch.

Example 41 includes the subject matter of Example 40, and further including means for determining, in response to a determination that the output buffer of the arbiter unit in the output stage does not have sustained congestion, that the network switch is not a root of congestion.

Example 42 includes the subject matter of any of Examples 40 and 41, and wherein the means for determining whether the input buffer of the remote network switch has sustained congestion comprises means for determining whether the remote network switch has temporary congestion a predefined number of times; and means for determining, in response to a determination that the remote network switch has temporary congestion the predefined number of times, that the remote network switch has sustained congestion.

Example 43 includes the subject matter of any of Examples 40-42, and further including circuitry for waiting a predefined amount of time between each determination of whether the remote network switch has temporary congestion.

Example 44 includes the subject matter of any of Examples 40-43, and wherein the means for determining whether the remote network switch has temporary congestion comprises means for receiving remote input buffer fullness information indicative of a number of packets that the remote network switch will accept from the network switch; means for determining whether the remote input buffer fullness information satisfies a threshold value; and means for determining, in response to a determination that the remote input buffer fullness information satisfies the threshold value, that the remote network switch has temporary congestion.

Example 45 includes the subject matter of any of Examples 40-44, and wherein the means for determining whether the remote input buffer fullness information satisfies a threshold value comprises means for determining whether the remote input buffer fullness information indicates that the remote network switch will accept zero packets from the network switch.

Example 46 includes the subject matter of any of Examples 40-45, and wherein the means for determining whether an input buffer of a remote network switch in communication with the arbiter unit in the output stage has sustained congestion comprises circuitry for receiving credit data indicative of a number of packets that the remote network switch will accept.

Example 47 includes the subject matter of any of Examples 40-46, and wherein the means for determining whether an output buffer of the arbiter unit in the output stage has sustained congestion comprises means for determining whether the output buffer has temporary congestion a predefined number of times; and means for determining, in response to a determination that the output buffer has temporary congestion over the predefined number of times, that the output buffer has sustained congestion.

Example 48 includes the subject matter of any of Examples 40-47, and further including circuitry for waiting a predefined amount of time between each determination of whether the output buffer has temporary congestion.

Example 49 includes the subject matter of any of Examples 40-48, and wherein the means for determining whether the output buffer has temporary congestion comprises means for determining, by the network switch, local output buffer fullness information indicative of a number of packets that the arbiter unit in the output stage will accept from the upstream stage; means for determining whether the local output buffer fullness information satisfies a threshold value; and means for determining, in response to a determination that the local output buffer fullness information satisfies the threshold value, that the output buffer has temporary congestion.

Example 50 includes the subject matter of any of Examples 40-49, and wherein the means for determining whether the local output buffer fullness information satisfies a threshold value comprises means for determining whether the local output buffer fullness information indicates that the arbiter unit in the output stage will accept zero packets from the upstream stage.

Example 51 includes the subject matter of any of Examples 40-50, and wherein the means for determining whether the output buffer has temporary congestion comprises means for determining effective fullness information indicative of an estimated build-up of packets upstream to the output buffer; and means for determining whether the output buffer has temporary congestion as a function of the effective fullness information.

The invention claimed is:

1. A network switch for determining a root of congestion, the network switch comprising:
   a plurality of arbiter units configured in a hierarchy of stages, wherein the hierarchy includes an output stage and an upstream stage;
   circuitry to:
   operate the arbiter units in the upstream stage at a packet transfer rate that is greater than a packet transfer rate of an arbiter unit in the output stage;
   determine whether an input buffer of a remote network switch in communication with the arbiter unit in the output stage has sustained congestion indicative of an inability to transfer packets from the arbiter unit in the output stage over a first predefined time period;
   determine whether an output buffer of the arbiter unit in the output stage has sustained congestion indicative of an inability to transfer packets from one or more arbiter units in the upstream stage over a second predefined time period;
   determine, as a function of whether the input buffer of the remote network switch has sustained congestion and whether the output buffer of the arbiter unit in the output stage has sustained congestion, whether the network switch is a root of congestion; and request, in response to a determination that the network switch is the root of congestion, that one or more input sources to the network switch reduce a throughput to the network switch.

2. The network switch of claim 1, wherein the circuitry is further to determine, in response to a determination that the output buffer of the arbiter unit in the output stage does not have sustained congestion, that the network switch is not a root of congestion.

3. The network switch of claim 1, wherein to determine whether the input buffer of the remote network switch has sustained congestion comprises to:
   determine whether the remote network switch has temporary congestion a predefined number of times; and
   determine, in response to a determination that the remote network switch has temporary congestion the predefined number of times, that the remote network switch has sustained congestion.

4. The network switch of claim 3, wherein the circuitry is further to wait a predefined amount of time between each determination of whether the remote network switch has temporary congestion.

5. The network switch of claim 3, wherein to determine whether the remote network switch has temporary congestion comprises to:
   receive remote input buffer fullness information indicative of a number of packets that the remote network switch will accept from the network switch;
   determine whether the remote input buffer fullness information satisfies a threshold value; and
   determine, in response to a determination that the remote input buffer fullness information satisfies the threshold value, that the remote network switch has temporary congestion.

6. The network switch of claim 5, wherein to determine whether the remote buffer data satisfies a threshold value comprises to determine whether the remote input buffer fullness information indicates that the remote network switch will accept zero packets from the network switch.

7. The network switch of claim 1, wherein to determine whether an input buffer of a remote network switch in communication with the arbiter unit in the output stage has sustained congestion comprises to receive credit data indicative of a number of packets that the remote network switch will accept.

8. The network switch of claim 1, wherein to determine whether an output buffer of the arbiter unit in the output stage has sustained congestion comprises to:
   determine whether the output buffer has temporary congestion a predefined number of times; and
   determine, in response to a determination that the output buffer has temporary congestion over the predefined number of times, that the output buffer has sustained congestion.

9. The network switch of claim 8, wherein the circuitry is further to wait a predefined amount of time between each determination of whether the output buffer has temporary congestion.

10. The network switch of claim 8, wherein to determine whether the output buffer has temporary congestion comprises to:
    determine local output buffer fullness information indicative of a number of packets that the arbiter unit in the output stage will accept from the upstream stage;
    determine whether the local output buffer fullness information satisfies a threshold value; and
    determine, in response to a determination that the local output buffer fullness information satisfies the threshold value, that the output buffer has temporary congestion.

11. The network switch of claim 10, wherein to determine whether the local output buffer fullness information satisfies a threshold value comprises to determine whether the local output buffer fullness information indicates that the arbiter unit in the output stage will accept zero packets from the upstream stage.

12. The network switch of claim 8, wherein to determine whether the output buffer has temporary congestion comprises to:
    determine effective fullness information indicative of an estimated build-up of packets upstream to the output buffer; and
    determine whether the output buffer has temporary congestion as a function of the effective fullness information.

13. One or more machine-readable storage media comprising a plurality of instructions stored thereon that, in response to being executed, cause a network switch to:
    operate arbiter units in an upstream stage at a packet transfer rate that is greater than a packet transfer rate of an arbiter unit in an output stage;
    determine whether an input buffer of a remote network switch in communication with the arbiter unit in the output stage has sustained congestion indicative of an inability to transfer packets from the arbiter unit in the output stage over a first predefined time period;
    determine whether an output buffer of the arbiter unit in the output stage has sustained congestion indicative of an inability to transfer packets from one or more arbiter units in the upstream stage over a second predefined time period;
    determine, as a function of whether the input buffer of the remote network switch has sustained congestion and whether the output buffer of the arbiter unit in the output stage has sustained congestion, whether the network switch is a root of congestion; and
    request, in response to a determination that the network switch is the root of congestion, that one or more input sources to the network switch reduce a throughput to the network switch.

14. The one or more machine-readable storage media of claim 13, wherein the plurality of instructions, when executed, further cause the network switch to determine, in response to a determination that the output buffer of the arbiter unit in the output stage does not have sustained congestion, that the network switch is not a root of congestion.

15. The one or more machine-readable storage media of claim 13, wherein to determine whether the input buffer of the remote network switch has sustained congestion comprises to:
    determine whether the remote network switch has temporary congestion a predefined number of times; and
    determine, in response to a determination that the remote network switch has temporary congestion the predefined number of times, that the remote network switch has sustained congestion.

16. The one or more machine-readable storage media of claim 15, wherein the plurality of instructions, when executed, further cause the network switch to wait a predefined amount of time between each determination of whether the remote network switch has temporary congestion.

17. The one or more machine-readable storage media of claim 15, wherein to determine whether the remote network switch has temporary congestion comprises to:
receive remote input buffer fullness information indicative of a number of packets that the remote network switch will accept from the network switch;
determine whether the remote input buffer fullness information satisfies a threshold value; and
determine, in response to a determination that the remote input buffer fullness information satisfies the threshold value, that the remote network switch has temporary congestion.

18. The one or more machine-readable storage media of claim 17, wherein to determine whether the remote buffer data satisfies a threshold value comprises to determine whether the remote input buffer fullness information indicates that the remote network switch will accept zero packets from the network switch.

19. The one or more machine-readable storage media of claim 13, wherein to determine whether an output buffer of the arbiter unit in the output stage has sustained congestion comprises to:
determine whether the output buffer has temporary congestion a predefined number of times; and
determine, in response to a determination that the output buffer has temporary congestion over the predefined number of times, that the output buffer has sustained congestion.

20. The one or more machine-readable storage media of claim 19, wherein the plurality of instructions, when executed, further cause the network switch to wait a predefined amount of time between each determination of whether the output buffer has temporary congestion.

21. The one or more machine-readable storage media of claim 19, wherein to determine whether the output buffer has temporary congestion comprises to:
determine local output buffer fullness information indicative of a number of packets that the arbiter unit in the output stage will accept from the upstream stage;
determine whether the local output buffer fullness information satisfies a threshold value; and
determine, in response to a determination that the local output buffer fullness information satisfies the threshold value, that the output buffer has temporary congestion.

22. A network switch for determining a root of congestion, the network switch comprising:
circuitry for operating, a plurality of arbiter units configured in a hierarchy of stages including an output stage and an upstream stage, the arbiter units in the upstream stage at a packet transfer rate that is greater than a packet transfer rate of the arbiter unit in the output stage;
means for determining whether an input buffer of a remote network switch in communication with the arbiter unit in the output stage has sustained congestion indicative of an inability to transfer packets from the arbiter unit in the output stage over a first predefined time period;
means for determining whether an output buffer of the arbiter unit in the output stage has sustained congestion indicative of an inability to transfer packets from one or more arbiter units in the upstream stage over a second predefined time period; and
means for determining, as a function of whether the input buffer of the remote network switch has sustained congestion and whether the output buffer of the arbiter unit in the output stage has sustained congestion, whether the network switch is a root of congestion.

23. A method for determining a root of congestion, the method comprising:
operating, by a network switch that includes a plurality of arbiter units configured in a hierarchy of stages including an output stage and an upstream stage, the arbiter units in the upstream stage at a packet transfer rate that is greater than a packet transfer rate of the arbiter unit in the output stage;
determining, by the network switch, whether an input buffer of a remote network switch in communication with the arbiter unit in the output stage has sustained congestion indicative of an inability to transfer packets from the arbiter unit in the output stage over a first predefined time period;
determining, by the network switch, whether an output buffer of the arbiter unit in the output stage has sustained congestion indicative of an inability to transfer packets from one or more arbiter units in the upstream stage over a second predefined time period;
determining, by the network switch and as a function of whether the input buffer of the remote network switch has sustained congestion and whether the output buffer of the arbiter unit in the output stage has sustained congestion, whether the network switch is a root of congestion; and
requesting, in response to a determination that the network switch is the root of congestion, that one or more input sources to the network switch reduce a throughput to the network switch.

24. The method of claim 23, further comprising determining, by the network switch and in response to a determination that the output buffer of the arbiter unit in the output stage does not have sustained congestion, that the network switch is not a root of congestion.

25. The method of claim 23, wherein determining whether the input buffer of the remote network switch has sustained congestion comprises:
determining whether the remote network switch has temporary congestion a predefined number of times; and
determining, in response to a determination that the remote network switch has temporary congestion the predefined number of times, that the remote network switch has sustained congestion.

26. The method of claim 25, further comprising waiting, by the network switch, a predefined amount of time between each determination of whether the remote network switch has temporary congestion.

27. The method of claim 25, wherein determining whether the remote network switch has temporary congestion comprises:
receiving remote input buffer fullness information indicative of a number of packets that the remote network switch will accept from the network switch;
determining whether the remote input buffer fullness information satisfies a threshold value; and
determining, in response to a determination that the remote input buffer fullness information satisfies the threshold value, that the remote network switch has temporary congestion.

28. The method of claim 27, wherein determining whether the remote input buffer fullness information satisfies a threshold value comprises determining whether the remote input buffer fullness information indicates that the remote network switch will accept zero packets from the network switch.

29. The method of claim 23, wherein determining whether an input buffer of a remote network switch in communication with the arbiter unit in the output stage has sustained congestion comprises receiving credit data indicative of a number of packets that the remote network switch will accept.

30. The method of claim 23, wherein determining whether an output buffer of the arbiter unit in the output stage has sustained congestion comprises:
- determining whether the output buffer has temporary congestion a predefined number of times; and
- determining, in response to a determination that the output buffer has temporary congestion over the predefined number of times, that the output buffer has sustained congestion.

\* \* \* \* \*